United States Patent Office 3,291,773
Patented Dec. 13, 1966

3,291,773
REFRACTORY MATERIAL AND METHOD FOR MAKING THE SAME
Robert Rodriguez, Anaheim, Calif., assignor to Thiokol Chemical Corporation, Bristol, Pa., a corporation of Delaware
No Drawing. Filed Jan. 4, 1962, Ser. No. 164,418
2 Claims. (Cl. 260—38)

This invention relates to an improved refractory material, and to methods of making the same.

In particular, the present invention relates to a refractory resin-filler combination comprising thermosetting phenolic resins containing perlite which is applied to a silicon dioxide cloth. The impregnated cloth is then subdivided, and is pressure molded at moderately high temperatures and pressures.

The resultant substance is a material particularly useful in the manufacture of rocket nozzles and other rocket components. The material withstands high temperatures, is highly resistant to erosion by the passage of high temperature-high velocity gases, and does not easily exofoliate under these same conditions.

Specifically, a flexible, woven $SiO_2$ cloth (i.e. a leached glass cloth) is impregnated with a mixture of an "A" stage phenolic resin, finely divided perlite, and optional volatiles. The impregnated cloth is then "B"-staged, solidifying to a thermoplastic resin. Suitably the cloth, so coated, is next chopped into small particles. After chopping, the material is placed into suitable molds and hardened to the final product under heat and pressure.

The phenolic resins employed are well known to the art as those suitable for molding, and are generally prepared (in the "A" stage) by refluxing a reaction mixture of liquefied phenol (e.g. containing more than 2 percent water) and formaldehyde (conventionally in aqueous solution), in such proportions that the molar ratio of phenol to formaldehyde is greater than 1:1. Refluxing is done in the presence of an acid catalyst, such as HCl, usually present in an amount of from 0.5–5 percent by weight of a phenol. The resulting resinoid is separated from water produced in the reaction, and may be either a liquid or solid product.

Numerous variations in the production of phenolics suitable for making molding materials are known to the art: cresols and xylols may replace phenol in whole or in part; numerous aldehydes and ketones can be used rather than formaldehyde; numerous acid catalysts are employed for the reaction. The reader is referred, for example, to Chapter 2, pages 12–54 of "The Chemistry and Technology of Plastics," by Nauth, Reinhold Publishing Corporation, New York, 1947, for extensive discussion of phenolic molding materials. Similarly, Chapter 6, pages 113–170, of "The Chemistry of Commercial Plastics," by Wakeman, published in 1947 by the same publisher, reviews the phenolic plastic art in detail.

The phenolic resin chosen is mixed in the "A"-stage with 2–25 percent, preferably 2–10 percent, by weight of the resin solids, of perlite, which is finely divided to have a particle size of about 200 mesh or less according to the U.S. Standard Sieve Scale. The perlite is added to the resin while the latter is in liquid form, if necessary with the resin being made more fluid by the addition of volatile solvents.

The resulting mixture is applied to the cloth in any convenient fashion such as dipping, brushing, rolling, or the like, such that the resin is present as about 20–40 percent by weight of the cloth, exclusive of the weight of perlite solids.

The impregnated cloth is next "B"-staged by heating at temperatures of from 130° F. to 400° F. for periods of time ranging from 1 or 2 hours to 10–15 minutes. To facilitate pressure molding, the volatile content of the "B"-stage resin should be kept low, preferably around 5–6 percent.

The resin-coated cloth is next subdivided by chopping. A particle size of about ½ inch square has been found convenient for many purposes, but this is not at all critical, and larger or smaller sizes can be used, depending on the final article to be molded.

After placing in an appropriate mold, the resin-coated $SiO_2$ cloth is heated at temperatures of from 300°–375° F. at pressures of from 750 lbs./sq. inch upward. A convenient suitable pressure is about 1000–1200 lbs./sq. inch. This process converts the phenolic into its "C"-stage, as known in the art.

A more complete understanding of the invention can be had by referring to the following illustrative example.

*Example 1*

A woven, leached glass, $SiO_2$ cloth was impregnated with a coating solution containing about 50 percent of solids comprising an "A"-stage phenolic resin and 200 mesh perlite in an amount of 6 percent of the weight of resin.

The impregnated cloth was next "B"-staged by heating for 2 hours at 170° F. The coated cloth now comprised 5.24 percent by weight of volatiles (e.g. water, alcohol solvent), 26.4 percent of resin solids, and about 2 percent of perlite, balance the $SiO_2$ cloth.

The coated cloth was next chopped into ½ inch squares, fitted into a mold, and heated at 350° F. under 1000 lbs./sq. inch to form a hard, infusible laminate. The product shows excellent cohesive resistance to any forces tending to erode, abrade, or delaminate.

Although specific embodiments have been shown and described herein, it is understood that they are illustrative, and are not to be construed as limiting on the scope and spirit of the invention.

What is claimed is:

1. The method of making a refractory article which comprises impregnating a woven $SiO_2$ cloth with an A-stage phenolic molding resin containing finely divided perlite, converting the resinous coating on the cloth to its B-stage by heating, subdividing the resultant resin-coated cloth into a plurality of particles of a size convenient for molding, and then laminating said particles one to another to form a coherent whole by heating the particles in a mold under temperature and pressure, whereby the resin is converted to its C-stage and a refractory laminate is produced.

2. A refractory article comprising a coherent laminate of a plurality of particles of a sub-divided woven $SiO_2$ cloth and finely divided perlite in a C-staged phenolic molding resin.

References Cited by the Examiner
UNITED STATES PATENTS 2,625,512  6/1953  Powell.
2,634,208  4/1953  Miscall.
2,749,266  6/1956  Eldred _____ 264—137

OTHER REFERENCES

Owens-Corning, "Fabrication of Experimental Low-Pressure Laminates," Modern Plastics, May 1944, p. 104–106 (p. 104 only relied upon).

Sonneborn, "Fiberglass Reinforced Plastics," N.Y., Reinhold, 1954, pages 31, 33 and 34 relied upon.

ROBERT F. WHITE, *Primary Examiner.*

MICHAEL V. BRINDISI, *Examiner.*

A. L. LEAVITT, R. B. MOFFITT, *Assistant Examiners.*